United States Patent
Kim et al.

(10) Patent No.: US 12,473,167 B2
(45) Date of Patent: Nov. 18, 2025

(54) AUTOMATIC SUPPLY APPARATUS OF SECONDARY BATTERY ELECTRODES AND METHOD OF AUTOMATICALLY SUPPLYING SECONDARY BATTERY ELECTRODES

(71) Applicant: MPLUS CORP., Cheongun-si (KR)

(72) Inventors: Jong Sung Kim, Seongnam-si (KR); Sun Ho Kang, Cheongju-si (KR); Jin Kyu Jun, Cheongju-si (KR)

(73) Assignee: MPLUS CORP., Cheongun-si (KR)

( * ) Notice: Subject to any disclaimer, the term of this patent is extended or adjusted under 35 U.S.C. 154(b) by 194 days.

(21) Appl. No.: 18/227,349

(22) Filed: Jul. 28, 2023

(65) Prior Publication Data

US 2025/0033914 A1  Jan. 30, 2025

(51) Int. Cl.
*B65H 19/12* (2006.01)
*B65H 19/18* (2006.01)
*H01M 10/04* (2006.01)

(52) U.S. Cl.
CPC ......... *B65H 19/1842* (2013.01); *B65H 19/12* (2013.01); *H01M 10/0404* (2013.01); *B65H 2406/366* (2013.01); *B65H 2801/72* (2013.01)

(58) Field of Classification Search
CPC .. B65H 19/12; B65H 19/102; B65H 19/1842; H01M 10/0404; H01M 4/04
See application file for complete search history.

(56) References Cited

U.S. PATENT DOCUMENTS

| | | | |
|---|---|---|---|
| 9,947,956 B2 * | 4/2018 | Hwang | H01M 10/0409 |
| 2017/0137247 A1 * | 5/2017 | Sato | B65H 19/1842 |
| 2017/0137248 A1 * | 5/2017 | Sato | B65H 19/102 |
| 2017/0327336 A1 * | 11/2017 | Vergentini | B65H 19/12 |
| 2018/0141772 A1 * | 5/2018 | Prankl | B65H 19/12 |

FOREIGN PATENT DOCUMENTS

| | | |
|---|---|---|
| KR | 10-1287410 B | 7/2013 |
| KR | 10-1806236 B | 12/2017 |

* cited by examiner

*Primary Examiner* — Sang K Kim
(74) *Attorney, Agent, or Firm* — Insight Law Group, PLLC; Seung Lee

(57) ABSTRACT

An automatic supply apparatus of secondary battery electrodes, which includes an electrode supply hoist 120; a supply shuttle 130 receiving electrodes in the form of reels from the electrode supply hoist 120; a first unwinder 140 and a second unwinder 150 disposed at a position the supply shuttle 130 comes forward. A notching facility 110 is disposed at a position where the supply shuttle 130 comes forward, and the first unwinder 140 is disposed in the notching facility 110, the second unwinder 150 is mounted on the notching facility 110 and disposed at a downward position of the first unwinder 140, and a tape supply device 160 is provided at a front position of the notching facility 110 so as to be disposed above the first unwinder 140.

The present invention provides a system in which one automatic supply shuttle moves in the Y-axis direction to feed multiple notching facilities, and can fully automatically feed and connect without help of an operator, thereby reducing the number of workers, achieving the effect of reducing space and reducing costs compared to the conventional system.

10 Claims, 13 Drawing Sheets

AUTOMATIC SUPPLY APPARATUS OF SECONDARY BATTERY ELECTRODES AND METHOD OF AUTOMATICALLY SUPPLYING SECONDARY BATTERY ELECTRODES

TECHNICAL FIELD

The present invention relates to an automatic supply apparatus of secondary battery electrodes, and more particularly to a novel configuration of an automatic supply apparatus of secondary battery electrodes and a method for automatically supplying electrodes in a reel format by a notching process after a slitting process during a secondary battery fabrication process.

BACKGROUND ART

Secondary batteries are generally used in electric vehicles, hybrid electric vehicles, plug-in hybrid electric vehicles, etc. as an alternative energy source to fossil fuels that cause air pollution. Secondary batteries are also used extensively in many other fields.

There is a need for an apparatus that reliably and continuously supplies electrodes in an electrode assembly fabrication process to improve the productivity of secondary batteries and reduce process defects during such a secondary battery fabrication process.

However, in the case of the existing automatic supply apparatus of secondary battery electrodes, there are problems such as a large amount of space occupied and a large amount of equipment cost, and the need for improvement is urgently required.

PRIOR ART REFERENCES

Korean Registered Patent No. 10-1287410 (registered on Jul. 12, 2013)
Korean Registered Patent No. 10-1806236 (registered on Dec. 1, 2017)

Invention

Technical Problem

It is an object of the present invention to provide an automatic supply apparatus of secondary battery electrodes, which is a system for automatically supplying electrodes in the form of reels to a notching process after a slitting process during a secondary battery fabrication process, and which is applicable to any process in which electrodes in the form of reels are input, and which automatically supplies and connect electrodes.

Technical Solution

To address the above objects, the present invention provides an automatic supply apparatus secondary battery electrodes, comprising: an electrode supply hoist 120; a supply shuttle 130 that receives electrodes in the form of reels from the electrode supply hoist 120; a first unwinder 140 and a second unwinder 150 disposed at incoming positions to which the supply shuttle 130 comes forward.

A notching facility 110 is disposed at a position where the supply shuttle 130 comes forward, the first unwinder 140 is disposed in the notching facility 110, the second unwinder 150 is mounted on the notching facility 110 and disposed at a downward position of the first unwinder 140, and a tape supply device 160 is provided at a front position of the notching facility 110 so as to be disposed above the first unwinder 140.

A multi-joint robot 134 of the supply shuttle 130 is equipped with a vision device, a gripper, and an auto-splicing suction block. The notching facility 110 is equipped with a first unwinding-side upper suction block 142 and a first unwinding-side lower suction block 144 so as to be disposed between the first unwinder 140 and the second unwinder 150. In the notching facility 110, a second unwinding-side upper suction block 152 and a second unwinding-side lower suction block 154 are arranged so as to be disposed in a downward position of the first unwinding-side lower suction block 144. A lower cutter 172 supported on the notching facility 110 operates to move back and forth between the second unwinding-side upper suction block 152 and the second unwinding-side lower suction block 154, and the notching facility 110 is configured to be equipped with a lower end detection color sensor 182.

According to the present invention, there is provided an automatic supply method of secondary battery electrodes using an automatic supply apparatus of secondary battery electrodes, comprising: a supply shuttle 130 that receives electrodes in the form of reels from an electrode supply hoist 120; a first unwinder 140 and a second unwinder 150 placed at incoming positions where the supply shuttle 130 comes forward; and a tape supply device 160 placed at a front position of the notching facility 110. The method comprises: supplying a new electrode 10AE to the first unwinder 140 by the supply shuttle 130 during an operation of the second unwinder 150; and taping the new electrode 10AE in the first unwinder 140 and an old electrode 10BE in the second unwinder 150 with a tape 162 supplied from the tape supply device 160.

The multi-joint robot 134 of the supply shuttle 130 of the automatic supply apparatus of secondary battery electrodes is equipped with a vision device, a gripper and an auto-splicing suction block. A front position of the notching facility 110 is equipped with the tape supply device 160 which is disposed above the first unwinder 140. The notching facility 110 is equipped with the first unwinding-side upper suction block 142 and the first unwinding-side lower suction block 144 disposed between the first unwinder 140 and the second unwinder 150. The notching facility 110 is equipped with a second unwinding-side upper suction block 152 and a second unwinding-side lower suction block 154 disposed at a downward position of the first unwinding-side lower suction block 144. A lower cutter 172 supported on the notching facility 110 is configured to operate to move back and forth between the second unwinding-side upper suction block 152 and the second unwinding-side lower suction block 154, and the notching facility 110 is equipped with a lower end detection color sensor 182. During an operation of the second unwinder 150, the supply shuttle 130 docks an electrode in the form of reels to the first unwinder 140. Here, the method further comprises: rotating the supply shuttle 130 to lead the electrode reel transferred to the first unwinder 140; confirming a taping position of the electrode with a vision device provided on the multi-joint robot 134 of the supply shuttle 130; performing lead by the gripper to the auto-splicing suction block; suctioning a portion of the new electrode 10AE that has been unwound from the first unwinder 140 by the first unwinding-side suction block 142; when the lower end detection color sensor detects that electrode exhaustion in the second unwinder 150 is imminent, stopping the operation of the notching facility 110 and stopping the operation of the supply shuttle 130, and securing the old electrode 10BE unwound from the second unwinder 150 by a web stopper 192 provided in the notching facility 110; performing a tape leading operation on the tape supply, and suctioning the tape 162 with a tape suction block provided on the tape supply device 160 to make it ready for standby; suctioning the forwardly positioned portion of the web stopper 192 on the old electrode 10BE unwound from the second unwinder 150 by the second unwinding-side upper suction block 152 and the second unwinding-side lower suction block 154; advancing the lower cutter 172 between the second unwinding-side upper suction block 152 and the second unwinding-side lower suction block 154 to cut the old electrode 10BE; rotating upwardly the second unwinding-side upper suction block 152 toward the first unwinding-side lower suction block 144 above to transfer the old electrode 10BE to the first unwinding-side lower suction block 144 so that the first unwinding-side lower suction block 144 suctions the old electrode 10BE; rotating downward the second unwinding-side upper suction block 152 to its original position after the old electrode 10BE is transferred to the first unwinding-side lower suction block 144; performing taping by the tape 162 by advancing the tape supply device 160 toward the new electrode 10AE which is being suctioned by the first unwinding-side upper suction block 142 and the first unwinding-side lower suction block 144 and the old electrode 10BE which is being suctioned by the first unwinding-side lower suction block 144; after completion of the taping operation of the old electrode 10BE and new electrode 10AE, lifting the tape suction block 161 to its original position, and lifting the web stopper 192 to prepare for electrode operation; after being cut by the lower cutter 172, rewinding the residual old electrode 10BE remaining in the second unwinder 150 by a reverse rotation of the second unwinder 150; with the old electrode 10BE and the new electrode 10AE taped by tape 162, starting an operation of the first unwinder 140; and recovering empty cores that are coupled to the second unwinder 150 but have residual old electrodes 10BE on their outer circumference after arrival of the supply shuttle 130.

Advantageous Effects

The present invention relates to a system for automatically supplying and connecting reel-type electrodes to a slitting and notching process during the secondary battery fabrication process, and is applicable to any process that involves inputting reel-type electrodes.

The present invention is a system in which a single automatic supply shuttle (i.e., a supply shuttle transferring electrodes) supplies to a plurality of notching facilities by moving in the Y-axis direction, and can supply and connect them fully automatically without help of an operator, thereby reducing the number of operators, and can be operated by one shuttle, thereby reducing space and reducing the amount of money compared to the conventional system. It has the effect of reducing the space and reducing the amount of money by more than half compared to the previous system.

Furthermore, the present invention has the effect of seamlessly connecting difficult-to-lead electrodes with a six-axis multi-joint robot, thereby significantly reducing the error rate caused by electrode breakage or incorrectly connected electrodes.

DETAILED EMBODIMENTS FOR PRACTICING THE INVENTION

Hereinafter, preferred embodiments of the present invention will be described in detail with reference to the accompanying drawings. The objects, features, and advantages of the present invention will be more readily understood by reference to the accompanying drawings and the following detailed description. Furthermore, in describing the present invention, specific descriptions of related disclosed configurations or features are omitted where it is determined that such descriptions would obscure the essence of the present invention.

In addition, terms such as first, second, A, B, (a, (b, and the like may be used to describe components of the present invention. Such terms are intended only to distinguish one component from another, and the nature, sequence, or order of such components is not limited by such terms. Where a component is described as being "connected," "coupled," or "attached" to another component, it is to be understood that the component may be directly connected or attached to the other component, but that another component may be "connected," "coupled," or "attached" between each component.

Furthermore, certain structural or functional descriptions according to the present invention are exemplified for the purpose of illustrating embodiments in accordance with the concepts of the present invention, and embodiments in accordance with the concepts of the present invention may be practiced in various forms and should not be construed as limiting to the embodiments described in this specification or application.

Figure 1:
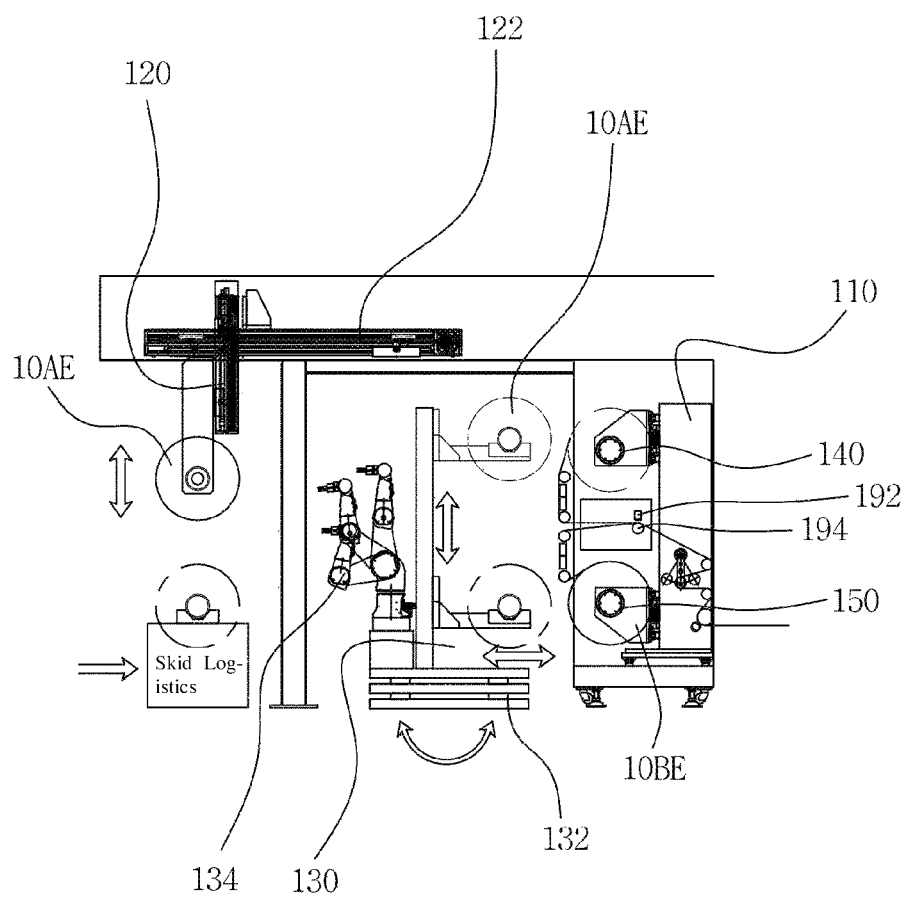
FIG. 1 is a side view schematically illustrating a structure of an automatic supply apparatus of secondary battery electrodes according to the present invention.
Figure 2:
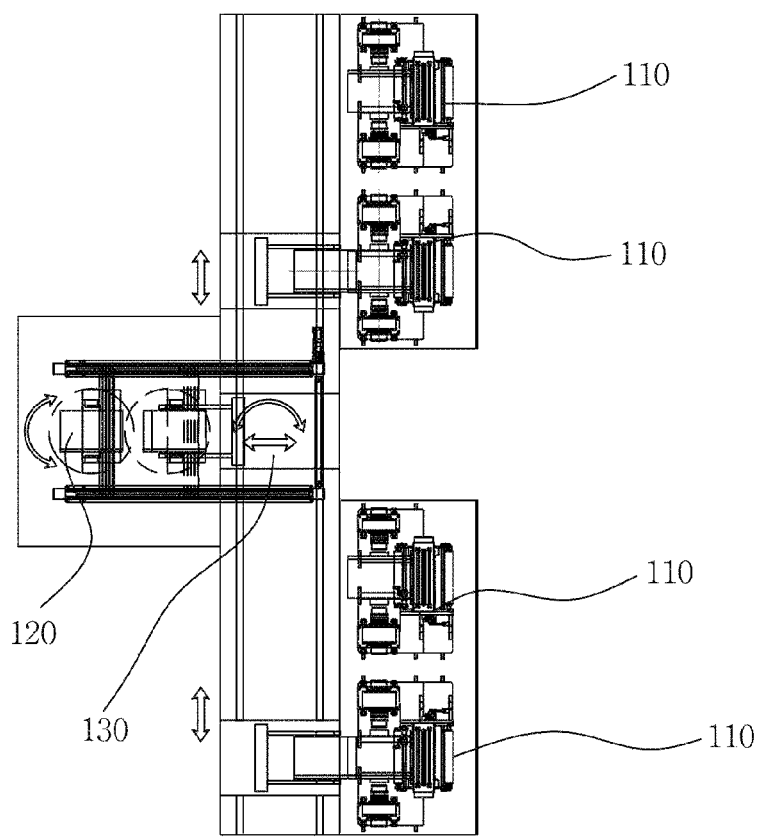
FIG. 2 is a plan view schematically illustrating a structure of the automatic supply apparatus of secondary battery electrodes and a structure of a notching facility according to the present invention.
Figure 3:
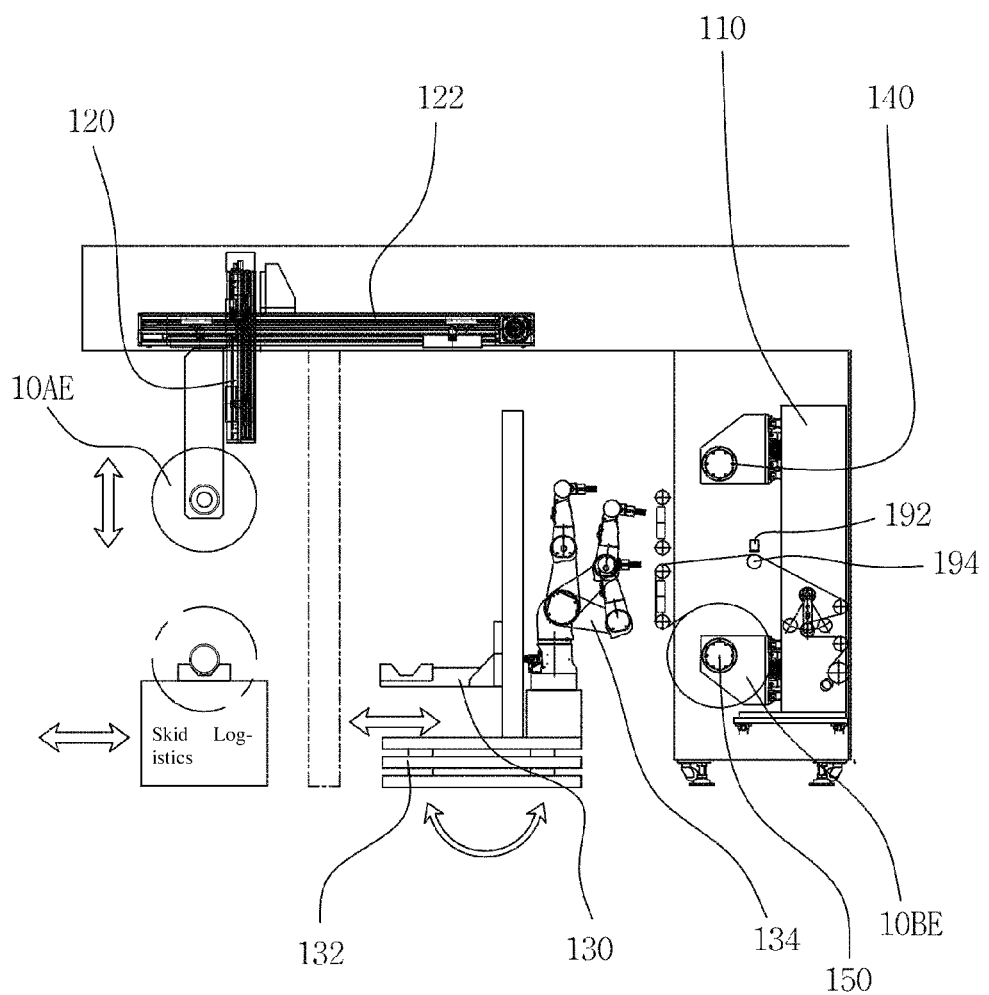
FIG. 3 is a side view illustrating a state in which a new electrode is picked up by an electrode supply hoist, which is a major part of the automatic supply apparatus of secondary battery electrodes according to the present invention.
Figure 4:
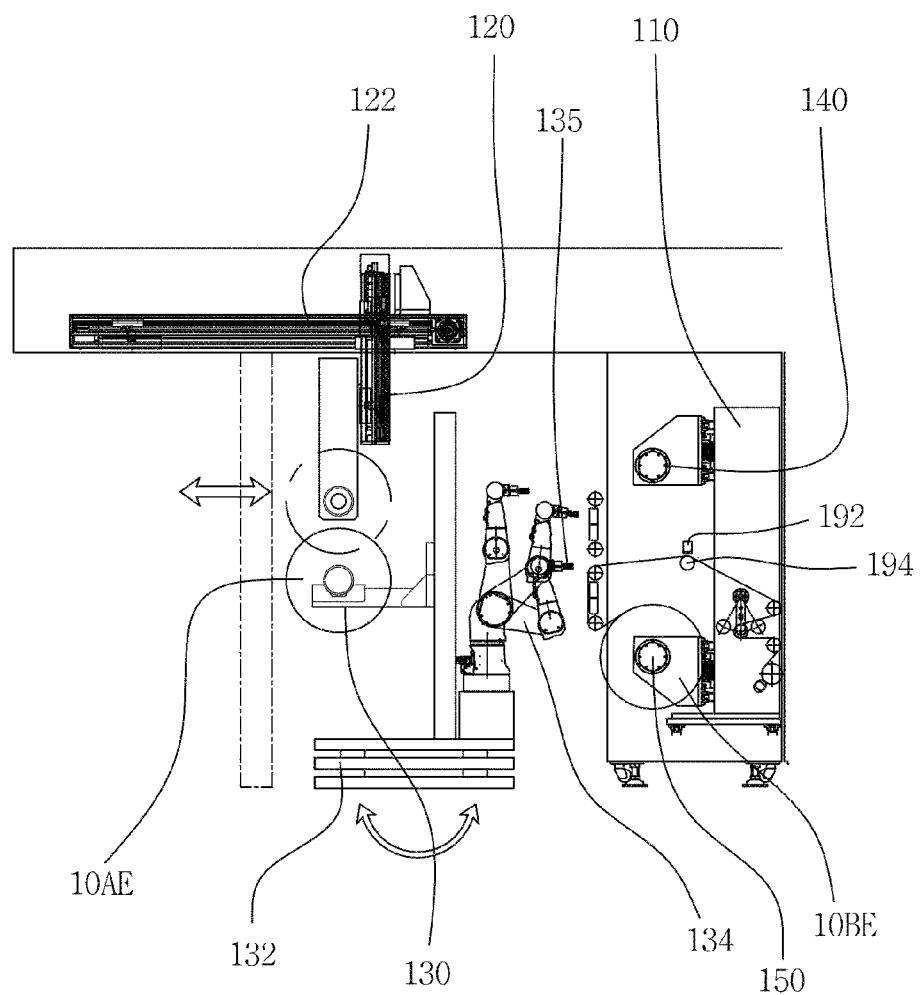
FIG. 4 is a side view illustrating the transfer of a new electrode from the electrode supply hoist shown in FIG. 3 to a supply shuttle.
Figure 5:
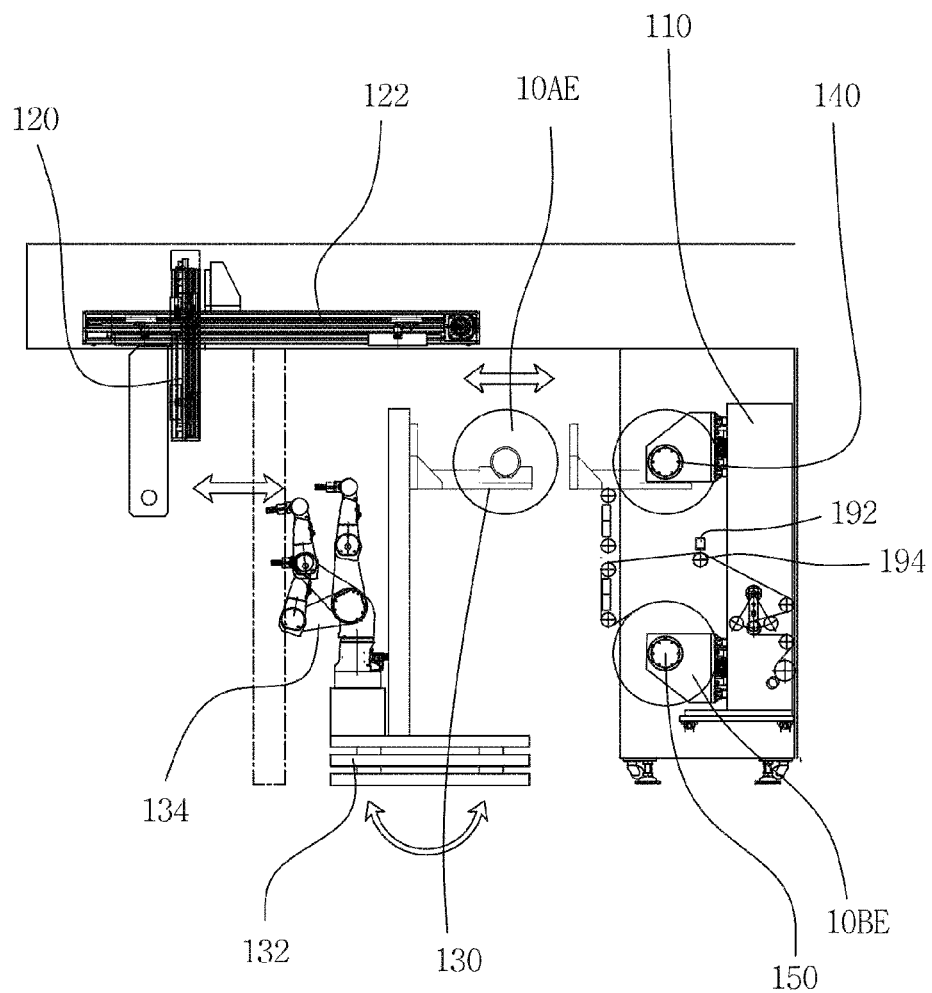
FIG. 5 is a side view schematically illustrating the process of transferring a new electrode to a first unwinder by the supply shuttle shown in FIG. 4.
Figure 6:
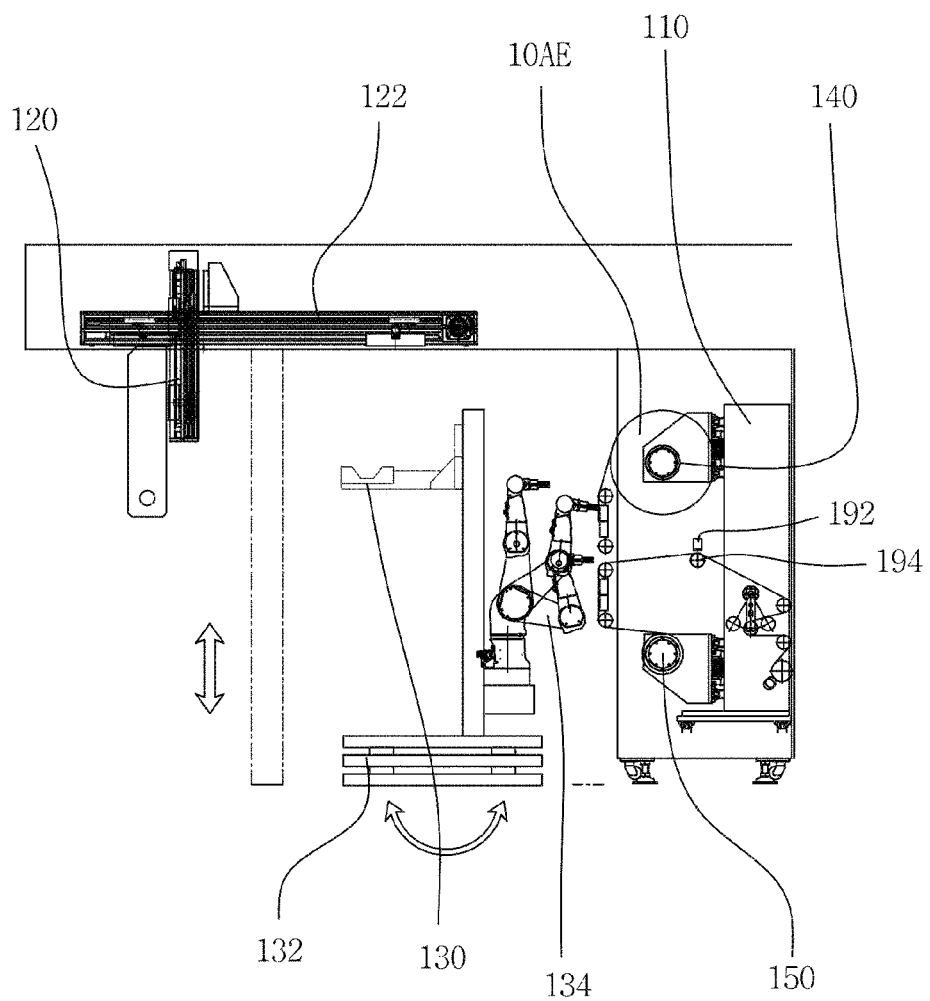
FIG. 6 is a side view showing a state in which a new electrode is transferred to the first unwinder shown in FIG. 5.
Figure 7:
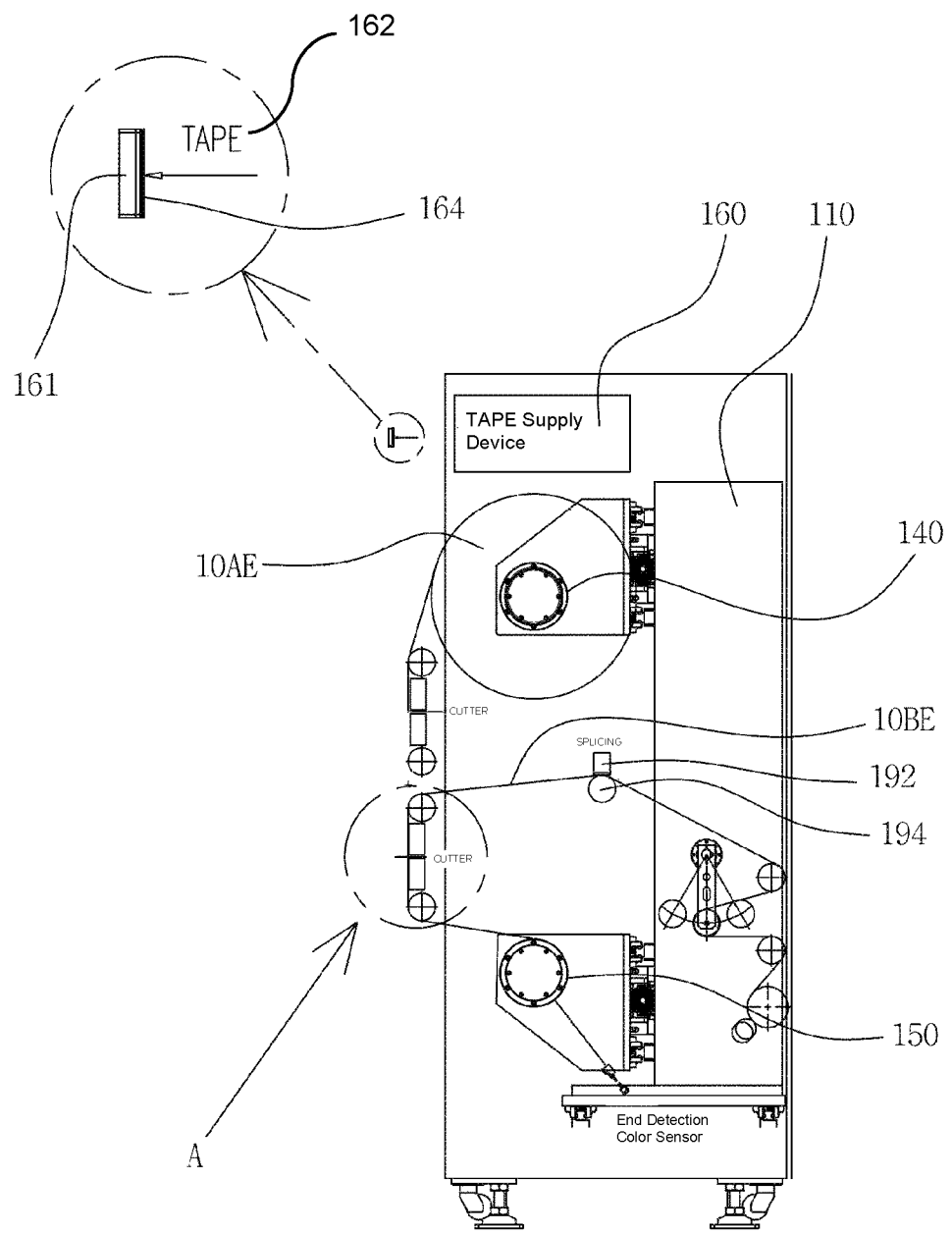
FIG. 7 is a side view schematically illustrating the sensing of the exhausted state of the old electrode in a second unwinder by the lower end detection color sensor, another major part of the present invention, and a state in which a tape is suctioned by a tape suction block of the tape supply device.
Figure 8:
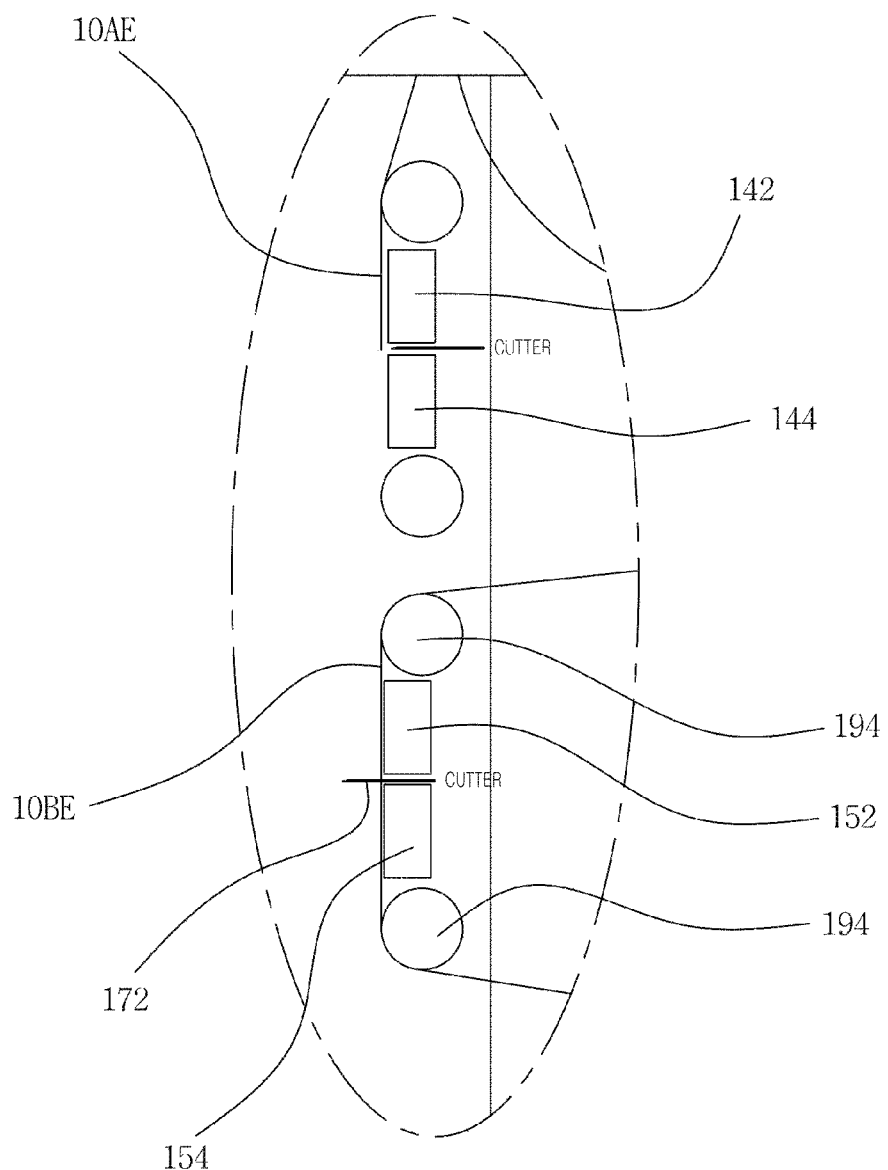
FIG. 8 is a side view showing an outline of a process of cutting an old electrode plate using a first unwinding-side upper suction block, a first unwinding-side lower suction block, a second unwinding-side upper suction block, and a second unwinding-side lower suction block, a new electrode plate and an old electrode plate and a lower cutter, which are major parts of the present invention.
Figure 9:
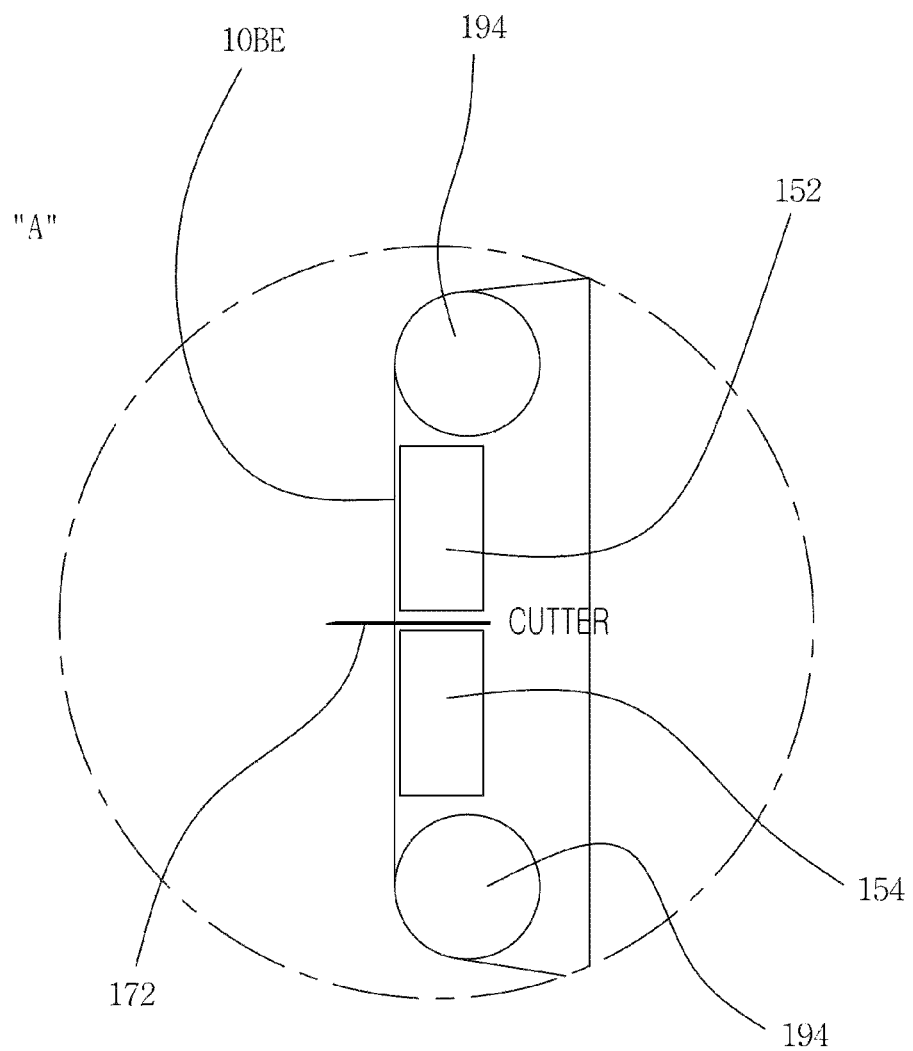
FIG. 9 is an enlarged view of portion A of FIG. 7.
Figure 10:
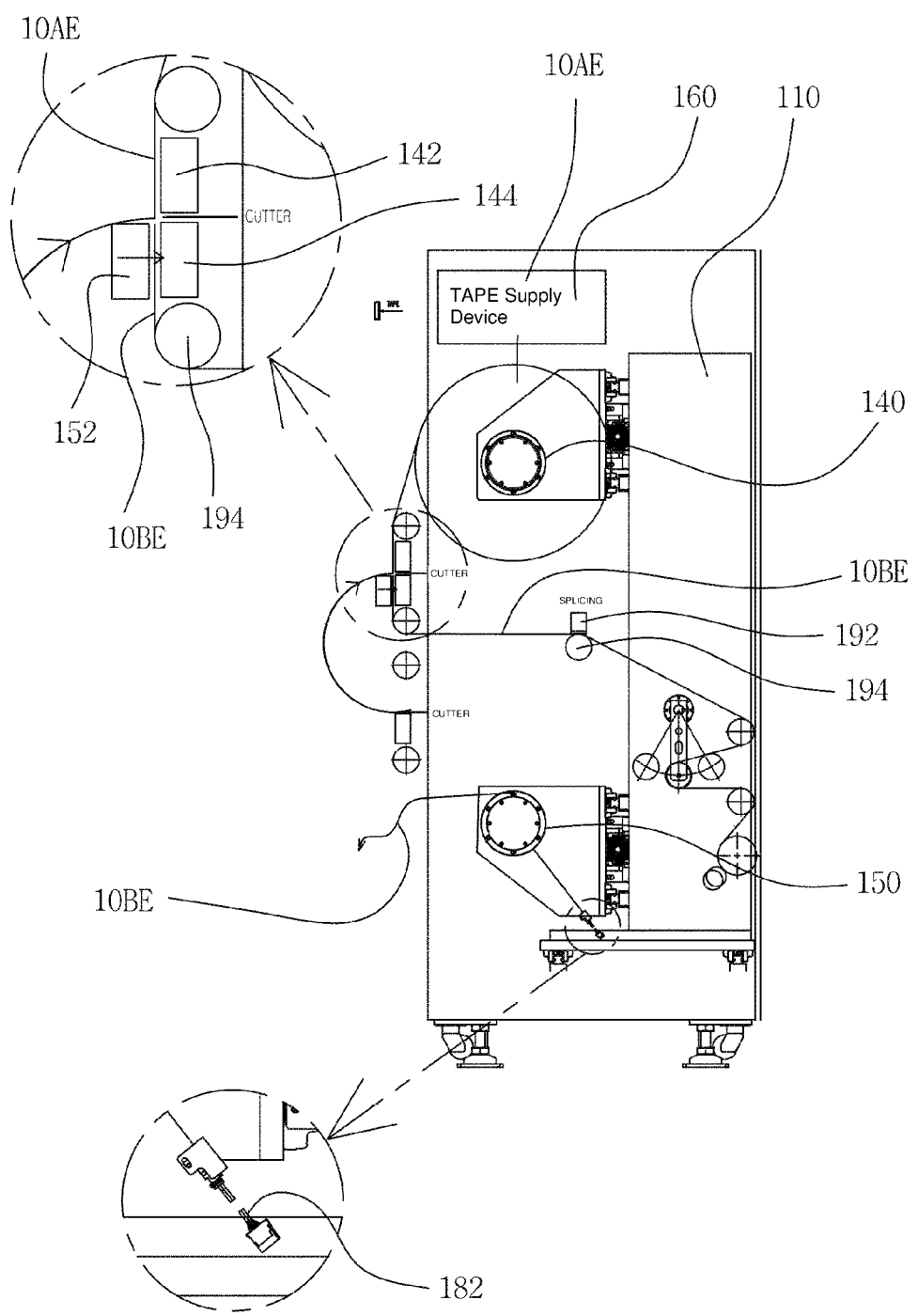
FIG. 10 is a side view schematically illustrating a state in which the second unwinding-side upper suction block, a major part of the present invention, is rotated upwardly toward the first unwinding-side lower suction block such that the first unwinding-side lower suction block has suctioned the old electrode.
Figure 11:
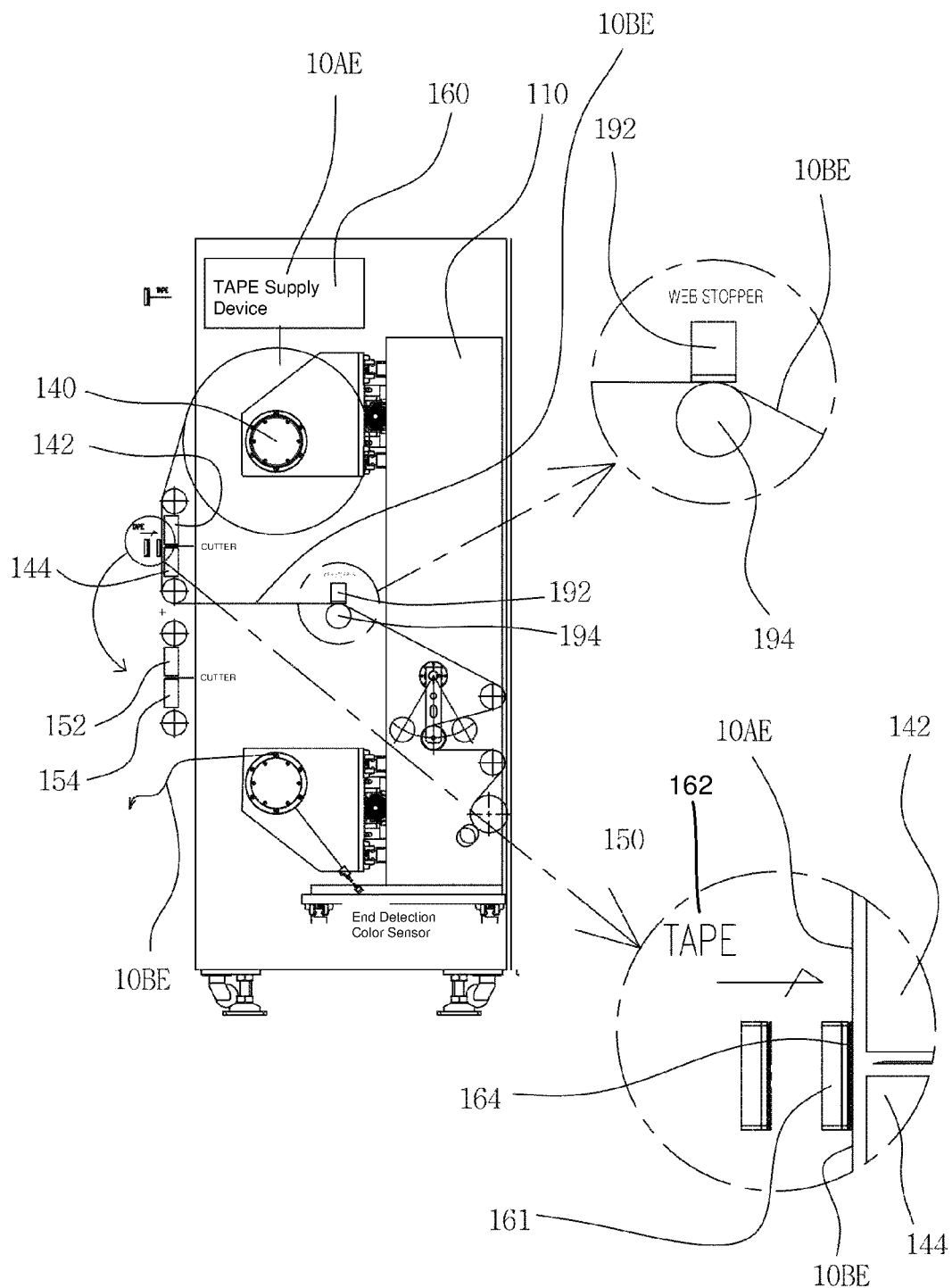
FIG. 11 is a side view schematically illustrating a state in which the old and new electrodes shown in FIG. 10 are taped together.
Figure 12:
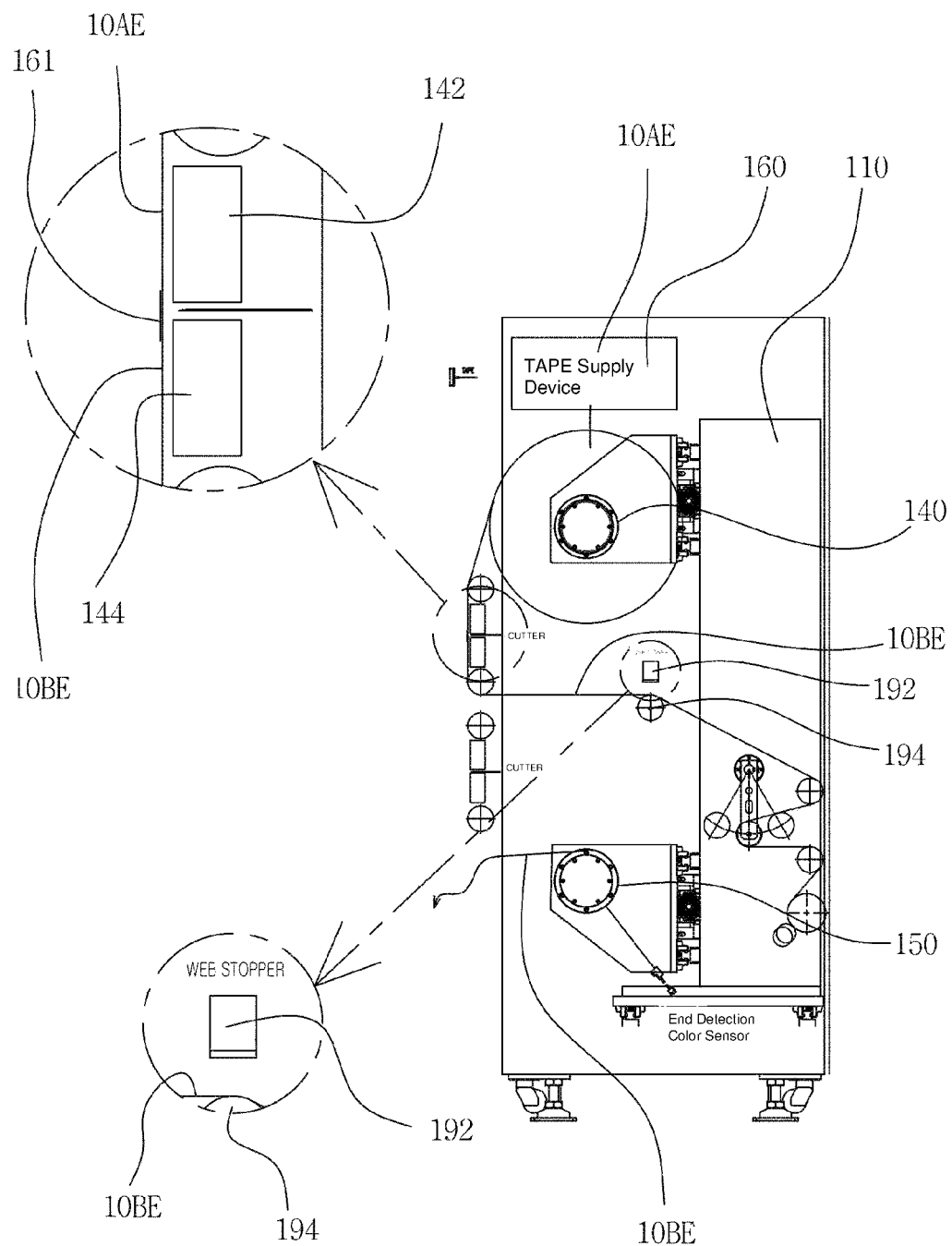
FIG. 12 is a side view schematically illustrating a state in which the second unwinding-side upper suction block is rotated downwardly into an original position after completion of the taping of the old and new electrodes by the tape of FIG. 11.
Figure 13:
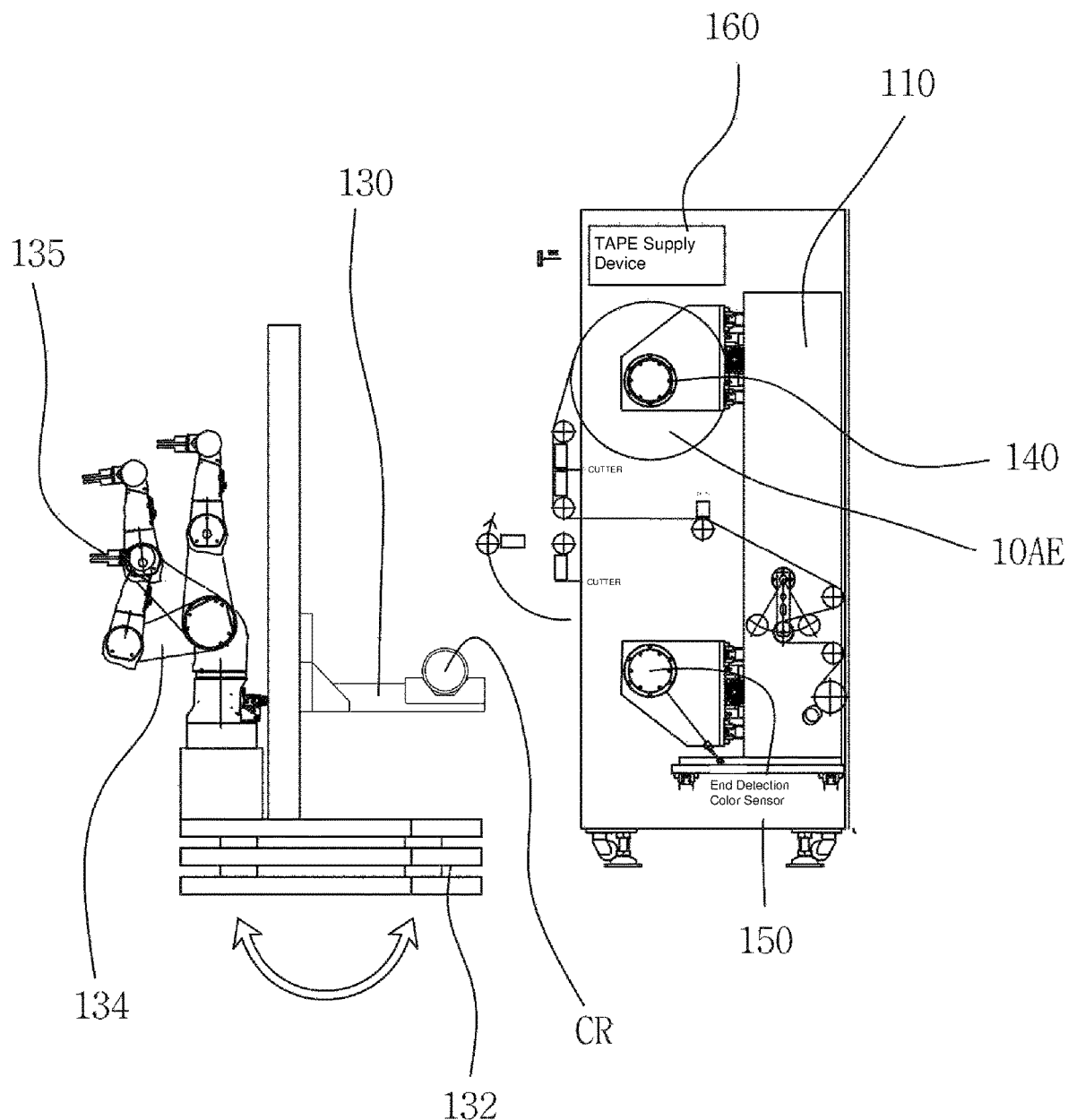
FIG. 13 is a side view illustrating the process of retrieving an empty core from the second unwinder by the supply shuttle, which is a major part of the present invention.

FIG. 1 is a side view schematically illustrating a structure of an automatic supply apparatus of secondary battery electrodes according to the present invention; FIG. 2 is a plan view schematically illustrating a structure of the automatic supply apparatus of secondary battery electrodes and a structure of a notching facility according to the present invention; FIG. 3 is a side view illustrating a state in which a new electrode is picked up by an electrode supply hoist, which is a major part of the automatic supply apparatus of secondary battery electrodes according to the present invention; FIG. 4 is a side view illustrating the transfer of a new electrode from the electrode supply hoist shown in FIG. 3 to a supply shuttle; FIG. 5 is a side view schematically illustrating the process of transferring a new electrode to a first unwinder by the supply shuttle shown in FIG. 4; FIG. 6 is a side view showing a state in which a new electrode is transferred to the first unwinder shown in FIG. 5; FIG. 7 is a side view schematically illustrating the sensing of the exhausted state of the old electrode in a second unwinder by the lower end detection color sensor, another major part of the present invention, and a state in which a tape is suctioned by a tape suction block of the tape supply device; FIG. 8 is a side view showing an outline of a process of cutting an old electrode plate using a first unwinding-side upper suction block, a first unwinding-side lower suction block, a second unwinding-side upper suction block, and a second unwinding-side lower suction block, a new electrode plate and an old electrode plate and a lower cutter, which are major parts of the present invention; FIG. 9 is an enlarged view of portion A of FIG. 7; FIG. 10 is a side view schematically illustrating a state in which the second unwinding-side upper suction block, a major part of the present invention, is rotated upwardly toward the first unwinding-side lower suction block such that the first unwinding-side lower suction block has suctioned the old electrode; FIG. 11 is a side view schematically illustrating a state in which the old and new electrodes shown in FIG. 10 are taped together; FIG. 12 is a side view schematically illustrating a state in which the second unwinding-side upper suction block is rotated downwardly into an original position after completion of the taping of the old and new electrodes by the tape of FIG. 11; and FIG. 13 is a side view illustrating the process of retrieving an empty core from the second unwinder by the supply shuttle, which is a major part of the present invention.

The present invention relates to a system for automatically supplying reel-type electrodes to a slitting and notching process during a secondary battery fabrication process, and is a system which automatically receives and connects the electrodes, applicable to all processes which input reel-type electrodes.

Referring to the drawings, the present invention relates to an automatic supply apparatus of secondary battery electrodes, comprising: an electrode supply hoist 120; a supply shuttle 130 that receives electrodes in the form of reels from the electrode supply hoist 120; and a first unwinder 140 and a second unwinder 150 placed at incoming positions where the supply shuttle 130 comes forward.

The aforementioned electrode supply hoist 120 is a unit that transfers electrodes from skid logistics to the shuttle supply equipment. The electrode supply hoist 120 includes the functions of detecting the direction of the raw material (Vision) and turning (Turn).

The supply shuttle 130 is mounted with a multi-joint robot 134 that leads electrodes so as to supply electrode reels to a plurality of NTC facilities (notching facilities) 110 and perform auto splicing. The supply shuttle 130 also includes tape detection and electrode leading vision and turn functions. The supply shuttle 130 is equipped with up/down and forward/backward functions, and includes a six-axis multi-joint robot 134 for leading. The up/down function of the supply shuttle 130 is possible by a lifting device such as a known lifting cylinder, and the forward/backward function of the supply shuttle 130 is also possible by a known forward/backward device such as a forward/backward cylinder.

The unwinder is a two-axis unwinder with auto splicing. "Two-axis unwinder" means a first unwinder 140 and a second unwinder 150. The unwinder includes a tape feeder. More specifically, the unwinder includes a tape feeder 162 disposed on top of the notching facility 110.

The electrode supply hoist 120 is configured, as shown in FIGS. 1 and 2, to be slidably supported on the hoist frame 122 and to operate forward and backward along the X-axis direction. Here, the electrode supply hoist 120 is connected to a hoist-side gripper which is connected to a lifting device, such as a cylinder, supported on the hoist frame 122, such that the hoist-side gripper may be configured to grip both ends of the core of the new electrode reel in the form of reels while being lifted in the z-axis direction by an operation of the lifting device to lift the new electrode reel in the form of reels.

Hereinafter, for convenience of explanation, the new electrode reel will be referred to as the new electrode 10AE and the old electrode reel will be referred to as the old electrode 10BE.

The electrode supply hoist 120 lifts the new electrode 10AE supplied by the Skid logistics in the Z-axis direction, moves forward to the supply shuttle 130, and then lowers the new electrode 10AE in the Z-axis direction to transfer it to the supply shuttle 130.

The supply shuttle 130 is supported on a main frame (not shown) and can be operated back and forth in the X-axis direction. Since the movement means for moving the supply shuttle 130 back and forth in the X-axis direction can be any device such as a known cylinder or a movable drive motor, more detailed description thereof will be omitted.

Additionally, the supply shuttle 130 is configured such that the multi-joint robot 134 is rotatably mounted on the robot support frame 132 by a rotational driving apparatus, so that the multi-joint robot 134 of the supply shuttle 130 is rotatable to face toward the notching facility 110 to which the first unwinder 140 and the second unwinder 150 are mounted, or to face away from the notching facility 110. Since the rotational driving apparatus for rotating the multi-joint robot 134 on the supply shuttle 130 may also employ a known device such as a rotating drive motor, more detailed description of the rotational driving apparatus will be omitted. FIGS. 3, 4, and 6 illustrate a state in which the multi-joint robot 134 of the supply shuttle 130 is rotated to face toward the notching facility 110 on which the first unwinder 140 and the second unwinder 150 are mounted whereas FIGS. 1, 5 and 13 illustrate a state in which the multi-joint robot 134 is rotated to face away from the notching facility 110.

According to the present invention, the multi-joint robot 134 is configured as a six-axis multi-joint robot 134. The multi-joint robot 134 of the present invention may be referred to as a Kentley robot.

A chuck provided on the supply shuttle 130 may grip both ends of the core of the center of the new electrode 10AE in the form of reels supplied by the electrode supply hoist 120.

Additionally, the supply shuttle 130 may be lifted in the z-axis direction by a shuttle-side lifting device. Since the shuttle-side lifting device may also employ a known lifting device such as a cylinder, a more detailed description of the shuttle-side lifting device will be omitted. Furthermore, since the forward and backward operation of the supply shuttle 130 is also possible by a known forward and backward operation cylinder or the like, a more detailed description of the forward and backward operation means for the forward and backward operation of the supply shuttle 130 will also be omitted.

According to the present invention, the notching facility 110 is disposed at a position where the supply shuttle 130 comes forward, the first unwinder 140 is disposed in the notching facility 110, the second unwinder 150 is mounted on the notching facility 110 so as to be disposed at a downward position of the first unwinder 140, and a tape supply device 160 is provided at a front position of the notching facility 110 so as to be disposed at an upward position of the first unwinder 140.

The multi-joint robot 134 of the supply shuttle 130 is equipped with a vision device 135, a gripper, and an auto-splicing suction block.

Further, the notching facility 110 is equipped with a first unwinding-side upper suction block 142 and a first unwinding-side lower suction block 144 disposed between the first unwinder 140 and the second unwinder 150.

In addition, the notching facility 110 includes a second unwinding-side upper suction block 152 and a second unwinding-side lower suction block 154 disposed at a downward position of the first unwinding-side lower suction block 144.

In this case, as shown in FIGS. 7 through 9, a lower cutter 172 supported on the notching facility 110 is configured for back-and-forth operation between the second unwinding-side upper suction block 152 and the second unwinding-side lower suction block 154. The lower cutter 172 may be connected to a cylinder rod of the back-and-forth actuating cylinder, such that the lower cutter 172 is configured to move forward or backward between the second unwinding-side upper suction block 152 and the second unwinding-side lower suction block 154 in response to expansion and contraction of the cylinder rod of the back-and-forth actuating cylinder. Means for moving forward and backward the lower cutter 172 may be employed other than the moving forward and backward cylinder.

Further, as shown in FIG. 10, the notching facility 110 is configured to be equipped with a lower end detection color sensor 182. The lower end detection sensor detects the exhaustion of the old electrode 10BE when the old electrode 10BE is exhausted in the second unwinder 150. More specifically, the lower end detection sensor detects the exhaustion of the old electrode 10BE in the second unwinder 150 by sensing the residual old electrode 10BE remaining on the outer surface of the core (CR) of the second unwinder 150 when the old electrode 10BE wound on the outer surface of the core of the second unwinder 150 is almost exhausted.

Meanwhile, the first unwinder 140 and the second unwinder 150 according to the present invention are equipped with a grip chuck on the winding shaft of the center thereof and the winding shaft is connected to a motor shaft of an unwinding drive motor (not shown) such that, each grip chuck grips the core of the new electrode 10AE and the core of the old electrode 10BE, respectively, so that the first unwinder 140 and the second unwinder 150 can rotate according to the rotation of the unwinding drive motor. At this time, the unwinding drive motor can be mounted on the notching facility 110. The unwinding drive device that rotates the first unwinder 140 and the second unwinder 150 at the notching facility 110 can employ a rotational driving apparatus other than the above-described unwinding drive motor.

According to the present invention, there is provided an automatic supply method of secondary battery electrodes using an automatic supply apparatus of secondary battery electrodes, comprising: a supply shuttle 130 that receives electrodes in the form of reels from an electrode supply hoist 120; a first unwinder 140 and a second unwinder 150 placed at incoming positions where the supply shuttle 130 comes forward; and a tape supply device 160 placed at a front position of the notching facility 110. The method comprises: supplying a new electrode 10AE to the first unwinder 140 by the supply shuttle 130 during an operation of the second unwinder 150; and taping the new electrode 10AE in the first unwinder 140 and an old electrode 10BE in the second unwinder 150 with a tape 162 supplied from the tape supply device 160.

The multi-joint robot 134 of the supply shuttle 130 of the automatic supply apparatus of secondary battery electrodes is equipped with a vision device, a gripper and an auto-splicing suction block. A front position of the notching facility 110 is equipped with the tape supply device 160 which is disposed above the first unwinder 140. The notching facility 110 is equipped with the first unwinding-side upper suction block 142 and the first unwinding-side lower suction block 144 disposed between the first unwinder 140 and the second unwinder 150. The notching facility 110 is equipped with a second unwinding-side upper suction block 152 and a second unwinding-side lower suction block 154 disposed at downward positions of the first unwinding-side lower suction block 144. A lower cutter 172 supported on the notching facility 110 is configured to operate to move back and forth between the second unwinding-side upper suction block 152 and the second unwinding-side lower suction block 154, and the notching facility 110 is equipped with a lower end detection color sensor 182.

During an operation of the second unwinder 150, an electrode in the form of reels is docked to the first unwinder 140 by the supply shuttle 130. The supply shuttle 130 is rotated to lead the electrode reel transferred to the first unwinder 140, and a taping position of the electrode is confirmed with a vision device provided on the multi-joint robot 134 of the supply shuttle 130. Lead is performed by the gripper to the auto-splicing suction block, and a portion of the new electrode 10AE that has been unwound from the first unwinder 140 is suctioned by the first unwinding-side suction block 142.

Meanwhile, the multi-joint robot 134 includes a vision device 135, a gripper, and an auto-splicing suction block to confirm a taping position of the electrode, and performs leading by the gripper to the auto-splicing suction block such that the multi-joint robot 134 performs automatic alignment of the electrode with the vision.

At this time, the first unwinding-side upper suction block 142 and the first unwinding-side lower suction block 144 are provided with a suction space inside, and a plurality of suction holes connected to the suction space inside are provided on the front thereof. The first unwinding-side upper suction block 142 and the first unwinding-side lower suction block 144 are connected to an external vacuum suction device through a connection member such as a flexible connection hose provided in the suction space inside, and the vacuum pressure from the vacuum suction device acts on the plurality of suction holes of the first unwinding-side upper suction block 142 and the first unwinding-side lower suction block 144 to suck a part of the new electrode 10AE that is unwound from the first unwinder 140 by the first unwinding-side upper suction block 142. See FIGS. 7, 8, and 10.

Meanwhile, when the lower end detection color sensor detects an impending electrode exhaustion condition in the second unwinder 150, the operation of the notching facility 110 is stopped and the operation of the supply shuttle 130 is stopped, and the old electrode 10BE unwound from the second unwinder 150 is secured via a web stopper 192 provided in the notching facility 110. See FIGS. 10 and 11.

At this time, according to the present invention, the old electrode 10BE wound on a core of the central portion of the second unwinder 150 is unwound from the outer surface of the core of the second unwinder 150 and passes through the outer surface of a guide roller 194 mounted on the notching facility 110 and is continuously supplied to the notching cutter side of the notching facility 110, and the web stopper 192 presses the old electrode 10BE on the outer surface of the guide roller 194 to secure the old electrode 10BE. Meanwhile, the web stopper 192 may be configured so that it is connected to a cylinder rod of a lifting cylinder and is configured to press and secure the old electrode 10BE on the outer surface of the guide rail or release the old electrode 10BE pressed on the outer surface of the guide rail according to expansion and contraction of the cylinder rod of the lifting cylinder. A means for lifting and lowering the web stopper 192 may adopt any lifting devices other than the lifting cylinder.

Also, according to the present invention, the tape supply device performs the tape leading operation, and the tape 162 is suctioned by the tape suction block 161 provided on the tape supply device 160 to prepare for standby, as shown in FIG. 7. At this time, the tape suction block 161 is connected to a vertically oriented cylinder rod of the lifting cylinder, so that the tape suction block 161 can be lowered to a position facing the old electrode 10BE and the new electrode 10AE or lifted to a position away from the old electrode 10BE and the new electrode 10AE according to the expansion of the vertically oriented cylinder rod of the lifting cylinder. Furthermore, the tape suction block 161 is equipped with a suction space portion inside and a plurality of tape supply-side suction holes connected to the suction space portion inside on the front side, and an external vacuum suction device is connected to the suction space portion inside the tape suction block 161 via a connector such as an undrawn flexible connection hose, such that vacuum pressure from the vacuum suction device may be configured to act on the plurality of tape supply-side suction holes of the tape suction block 161 to cause the tape suction block 161 to be ready to hold tape 162 in a suctioned state. See FIG. 7.

According to the present invention, the forwardly positioned portion of the web stopper 192 on the old electrode 10BE unwound from the second unwinder 150 is suctioned by the second unwinding-side upper suction block 152 and the second unwinding-side lower suction block 154, cutting the old electrode 10BE by moving the lower cutter 172 forward between the second unwinding-side upper suction block 152 and the second unwinding-side lower suction block 154. See FIGS. 8 and 9.

Thereafter, the second unwinding-side upper suction block 152, with the old electrode 10BE suctioned by the vacuum pressure acting on the plurality of suction holes, rotates upwardly toward the first unwinding-side lower suction block 144 above, transfers the old electrode 10BE to the first unwinding-side lower suction block 144. The first unwinding-side lower suction block 144 then suctions the transferred old electrode 10BE. See FIGS. 11 and 12.

Thereafter, after transferring the old electrode 10BE to the first unwinding-side lower suction block 144, the second unwinding-side upper suction block 152 rotates downward to its original position. The tape suction block 161 of the tape supply device 160 advances to the new electrode 10AE, being suctioned by the first unwinding-side upper suction block 142, and the old electrode 10BE, being suctioned by the first unwinding-side lower suction block 144, and perform taping by the tape 162 on the new electrode 10AE and the old electrode 10BE. FIG. 12 illustrates a state in which the taping of the old and new electrodes is completed by the tape.

At this time, the second unwinding-side upper suction block 152 may be configured so that, the second unwinding-side upper suction block 152 is connected to a motor shaft of a rotating drive motor mounted on the notching facility 110, so that the second unwinding-side upper suction block 152 rotates upwardly toward the first unwinding-side lower suction block 144 or downwardly away from the first unwinding-side lower suction block 144 as the motor shaft of the rotating drive motor rotates forward or reverse. The rotating means for upwardly or downwardly rotating the second unwinding-side upper suction block 152 may be any device for rotating operation other than the aforementioned rotating drive motor.

Thereafter, after completion of the taping of the old electrode 10BE and new electrode 10AE, the tape suction block 161 is lifted to its original position, and the web stopper 192 is lifted to prepare for electrode movement. See FIG. 12.

Next, as shown in FIG. 13, the residual old electrode 10BE remaining in the second unwinder 150 after being cut by the lower cutter 172 is rewound by the rotation of the second unwinder 150, and the operation of the first unwinder 140 begins with the old electrode 10BE and new electrode 10AE taped by tape 162. The empty core (CR (precisely, the core with some residual old electrode 10BE on its outer surface), which is coupled to the second unwinder 150, proceeds to be recovered after the arrival of the supply shuttle 130.

According to the present invention, a 4 NTC progression operation is performed by repeating the above process. In other words, an automatic supply of secondary battery electrodes to four notching facilities 110 is performed by repeating the above process. The automatic supply of secondary battery electrodes to the first unwinder 140 and the second unwinder 150 is performed. The order of the automatic supply of secondary battery electrodes for first unwinder 140 and second unwinder 150 is the same.

Thus, the automatic supply apparatus of secondary battery electrodes according to the present invention allows one automatic supply SHUTTLE (i.e., supply shuttle 130 that transfers the electrodes) to move in the y-axis direction to feed a plurality of notching facilities 110, and may supply and connect electrodes fully automatically without help of an operator, thus reducing the number of operators, and can be operated by a single shuttle, which has the effect of reducing space and cost compared to conventional methods. It has the effect of reducing the space and reducing the amount of money by more than half compared to the previous system.

In addition, the present invention has the effect of seamlessly connecting difficult-to-lead electrodes to the six-axis multi-joint robot 134, significantly reducing the error rate caused by electrode breakage or incorrectly connected electrodes.

It will be understood by one of ordinary skill in the art to which the present invention pertains that the present invention is not limited to the above embodiments, but is subject to various modifications and variations without altering the spirit of the present invention.

Accordingly, the embodiments described above are provided to fully inform one of ordinary skill in the art to which the present invention pertains of the scope of the invention, and should be understood to be exemplary and non-limiting in all respects, and the present invention is only defined by the scope of the claims.

| Explanation of reference numbers | |
|---|---|
| 10AE. new electrode | 10BE. old electrode |
| 110. notching facility | 120. electrode supply hoist |
| 122. hoist frame | 130. supply shuttle |
| 132. robot support frame | 134. multi-joint robot |
| 140. first unwinder | |
| 142. first unwinding-side upper suction block | |
| 144. first unwinding-side lower suction block | |
| 150. second unwinder | |
| 152. second unwinding-side upper suction block | |
| 154. second unwinding-side lower suction block | |
| 160. tape supply device | 164. tape |
| 172. lower cutter | 182. lower end detection color sensor |
| 192. web Stopper | 194. guide roller |

What is claimed is:

1. An automatic supply apparatus of secondary battery electrodes, comprising:
    an electrode supply hoist;
    a supply shuttle for receiving electrodes in a form of reels from the electrode supply hoist; and
    a first unwinder and a second unwinder disposed at positions where the supply shuttle comes forward,
    wherein a notching facility is disposed at a position where the supply shuttle comes forward,
    a first unwinder is disposed in the notching facility,
    a second unwinder is mounted on the notching facility and disposed at a downward position of the first unwinder, and
    the notching facility is equipped with a tape supply device at a front position of the first unwinder so as to be disposed above the first unwinder,
    wherein a multi-joint robot of the supply shuttle is equipped with a vision device, a gripper, and an auto-splicing suction block,
    in the notching facility, a second unwinding-side upper suction block and a second unwinding-side lower suction block are arranged so as to be disposed at downward positions of the first unwinding-side lower suction block, and
    a lower cutter supported on the notching facility operates to move back and forth between the second unwinding-side upper suction block and the second unwinding-side lower suction block.

2. The automatic supply apparatus according to claim 1, wherein a multi-joint robot of the supply shuttle is equipped with a vision device, a gripper, and an auto-splicing suction block,
    the notching facility is equipped with a first unwinding-side upper suction block and a first unwinding-side lower suction block so as to be disposed between the first unwinder and the second unwinder, and
    the notching facility is configured to be equipped with a lower end detection color sensor.

3. The automatic supply apparatus according to claim 2, wherein the multi-joint robot includes a vision device, a gripper, and an auto-splicing suction block so as to confirm a taping position of the electrode and performs leading by the gripper to the auto-splicing suction block such that the multi-joint robot perform automatic alignment of the electrode with the vision.

4. An automatic supply method of secondary battery electrodes using an automatic supply apparatus of secondary battery electrodes, comprising: a supply shuttle that receives electrodes in the form of reels from an electrode supply hoist; a first unwinder and a second unwinder placed at incoming positions where the supply shuttle comes forward; and a tape supply device placed at a front position of the notching facility,
    the method comprising:
    supplying a new electrode to the first unwinder by the supply shuttle during an operation of the second unwinder; and
    taping the new electrode in the first unwinder and an old electrode in the second unwinder with a tape supplied from the tape supply device,
    wherein the multi-joint robot of the supply shuttle of the automatic supply apparatus of secondary battery electrodes is equipped with a vision device, a gripper and an auto-splicing suction block,
    wherein a front position of the notching facility is equipped with the tape supply device so as to be disposed above the first unwinder,
    wherein the notching facility is equipped with a first unwinding-side upper suction block and a first unwinding-side lower suction block so as to be disposed between the first unwinder and the second unwinder,
    wherein the notching facility is equipped with a second unwinding-side upper suction block and a second unwinding-side lower suction block disposed at downward positions of the first unwinding-side lower suction block,
    wherein a lower cutter supported on the notching facility is configured to operate to move back and forth between the second unwinding-side upper suction block and the second unwinding-side lower suction block, and
    wherein the notching facility is equipped with a lower end detection color sensor,
    wherein the method further comprises:
    during an operation of the second unwinder, docking an electrode in the form of reels to the first unwinder by the supply shuttle,
    rotating the supply shuttle to lead the electrode reel transferred to the first unwinder;

confirming a taping position of the electrode with the vision device provided on the multi-joint robot of the supply shuttle;

performing lead by the gripper to the auto-splicing suction block;

suctioning a portion of the new electrode that has been unwound from the first unwinder by the first unwinding-side suction block;

when the lower end detection color sensor detects that electrode exhaustion in the second unwinder is imminent, stopping the operation of the notching facility and stopping the operation of the supply shuttle, and securing the old electrode unwound from the second unwinder by a web stopper provided in the notching facility.

5. The automatic supply method according to claim 4, performing a tape leading operation on the tape supply, and suctioning the tape with a tape suction block provided on the tape supply device to make it ready for standby; and suctioning a forwardly positioned portion of the web stopper on the old electrode unwound from the second unwinder by the second unwinding-side upper suction block and the second unwinding-side lower suction block.

6. The automatic supply method according to claim 5, the method further comprising:

advancing the lower cutter between the second unwinding-side upper suction block and the second unwinding-side lower suction block to cut the old electrode.

7. The automatic supply method according to claim 6, the method further comprising:

rotating upwardly the second unwinding-side upper suction block toward the first unwinding-side lower suction block above to transfer the old electrode to the first unwinding-side lower suction block so that the first unwinding-side lower suction block suctions the old electrode; and rotating downward the second unwinding-side upper suction block to its original position after the old electrode is transferred to the first unwinding-side lower suction block.

8. The automatic supply method according to claim 7, the method further comprising:

performing taping by the tape by advancing the tape suction block of the tape supply device toward the new electrode which is being suctioned by the first unwinding-side upper suction block and the first unwinding-side lower suction block and the old electrode which is being suctioned by the first unwinding-side lower suction block.

9. The automatic supply method according to claim 8, the method further comprising:

after completion of the taping operation of the old electrode and new electrode, lifting the tape suction block to its original position, and lifting the web stopper to prepare for an electrode operation.

10. The automatic supply method according to claim 9, the method further comprising:

after being cut by the lower cutter, rewinding a residual old electrode remaining in the second unwinder by a reverse rotation of the second unwinder;

with the old electrode and the new electrode taped by tape, starting an operation of the first unwinder; and recovering empty cores that are coupled to the second unwinder but have residual old electrodes on their outer surface after arrival of the supply shuttle.

* * * * *